(12) United States Patent
Ankrom et al.

(10) Patent No.: US 6,257,067 B1
(45) Date of Patent: Jul. 10, 2001

(54) VERTICAL DIRECTION SPACECRAFT VIBRATION TEST SYSTEM WITH PSEUDO-FREE BOUNDARY CONDITIONS

(75) Inventors: Mark E. Ankrom, Huntington Beach; Scott B. Pano, Torrance; Lawrence C. Vicari, Los Angeles, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/301,444

(22) Filed: Apr. 28, 1999

(51) Int. Cl.[7] .............................. G01N 29/00; B06B 3/00
(52) U.S. Cl. ................. 73/663; 73/667; 73/668; 73/665
(58) Field of Search .............................. 73/570, 662, 663, 73/667, 668, 672, 290 V, 581, 582, 583, 856, 665, 666

(56) References Cited

U.S. PATENT DOCUMENTS

| | | | |
|---|---|---|---|
| 3,163,786 | * 12/1964 | Dickinson | 73/668 |
| 4,069,706 | * 1/1978 | Marshall et al. | 73/666 |
| 4,445,381 | * 5/1984 | Russenberger | 73/666 |
| 4,858,488 | * 8/1989 | Butts | 73/668 |
| 4,883,287 | * 11/1989 | Murakami et al. | 280/665 |
| 4,928,532 | * 5/1990 | O'Connor et al. | 73/856 |
| 5,309,766 | * 5/1994 | Touzeau et al. | 73/663 |
| 5,386,728 | * 2/1995 | Norton et al. | 73/668 |
| 5,594,177 | * 1/1997 | Hanse | 73/663 |

* cited by examiner

Primary Examiner—Hezron Williams
Assistant Examiner—Jacques Saint-Surin
(74) Attorney, Agent, or Firm—T. Gudmestad

(57) ABSTRACT

A method, apparatus, for subjecting a test object to vibrational energy testing is disclosed. The apparatus comprises a rotatable joint such as a hydrostatic ball joint for transmitting energy from a force generator to the test object, and a support structure, coupled to the test object and the rotatable joint, for flexibly restraining the test object from rotating about the center of rotation of the rotatable joint. In one embodiment of the invention, the support structure comprises a support member and at least one suspension device disposed between the support member and a ground datum. In another embodiment, the suspension device applies a suspension force to the support member in a direction substantially perpendicular to a vector from the center of rotation to the suspending force. In this embodiment the suspension devices are subjected primarily to compression and tension forces. The method comprises the steps of coupling a test object to a rotatable joint having a center of rotation, flexibly restraining the test object from rotating about the center of rotation, and applying vibrational energy substantially along a first axis passing through the center of rotation to the rotatable joint.

19 Claims, 5 Drawing Sheets

VERTICAL DIRECTION SPACECRAFT VIBRATION TEST SYSTEM WITH PSEUDO-FREE BOUNDARY CONDITIONS

BACKGROUND OF THE INVENTION

1. Field of the Invention

The present invention relates to systems and methods of environmental testing, and in particular to a method and system for subjecting a test object to vibrational energy.

2. Description of the Related Art

When in use, storage, or transport, many products are subjected to moderate to severe environmental factors that detrimentally impact their longevity and functionality. Such environmental factors include temperature variations, applied vibrational energy of a variety of different power spectral densities, shock, and exposure to corrosive materials.

During the development phase, products that are expected to be operated, transported, or stored in such environments are extensively tested to assure that the product design meets its design specifications in the expected environment. In addition to this development phase testing, some products are individually tested before delivery to further reduce the risk of failure in severe environments. This is especially important with products that cannot be easily or inexpensively repaired.

For example, commercial and military satellites are expensive to deploy and cannot be easily repaired when in orbit. At the same time, these satellites are exposed to a severe environment that includes wide temperature variations and strong vibrational energy when deployed by launch vehicles.

For these reasons, before deployment, satellites are usually exposed to substantial environmental testing before delivery. These tests verify the structural integrity of the spacecraft, and allow correlation of the spacecraft's structural dynamics with predictive models.

While extensive vibrational testing can effectively reduce the risk of a satellite failure during deployment or operation and can help verify spacecraft structural dynamics, one of the difficulties of such testing is that of simulating the vibrational environment induced by the launch event, particularly vibrations induced primarily along a thrust axis of the combined launch vehicle and assembly.

Current shaker systems rely on a force generator and its supports (flexures, trunions, seismic mass, etc.) to provide lateral and rotational restraint of the spacecraft. The dynamics of these additional masses and springs combine with the spacecraft dynamics in an undesirable manner. Other shaker systems place the satellite on a force generator and rigidly restrain all motion except in the direction of vibration from the force generator. Unfortunately, such systems require precision alignment and ambient temperature control of within plus or minus four degrees Fahrenheit (±4° F.) to prevent jamming between the movable portion of the shaker test device and the structure used to restrain motion.

Another solution is to use a "free" system that has a rigid connection between the vibration fixture coupled to the spacecraft and the force generator. Unfortunately, such "free" systems can induce several vibration modes that are attributed to the mass, stiffness, and inertia of the force generator and associated structures. The dynamics of the force generator and associated support structures therefore make it difficult for engineers to correlate math models with actual vibration test results.

What is needed is an apparatus and method for vibration testing that permits simulation of easily-definable and controllable boundary conditions, thereby providing a better approximation of the environment to be encountered during launch, and permitting more accurate comparisons with predicted results from mathematical models. The present invention satisfies that need.

SUMMARY OF THE INVENTION

To address the requirements described above, the present invention discloses an apparatus, and method for subjecting a test object to vibrational energy.

The apparatus comprises a rotatable joint such as a hydrostatic ball joint or flexure for transmitting energy from a force generator to the test object, and a support structure, coupled to the test object and the rotatable joint, for flexibly restraining the test object from rotating about the center of rotation of the rotatable joint. In one embodiment of the invention, the support structure comprises a support member and at least one suspension device disposed between the support member and a ground datum. In another embodiment, the suspension device applies a suspension force to the support member in a direction substantially perpendicular to a vector from the center of rotation to the suspending force. In this embodiment the suspension devices are subjected primarily to compression and tension forces. Also, a suspension system that applies forces acting directly through the center of rotation can be used to limit potentially damaging lateral forces applied to the force generator device. By acting through the center of rotation, these forces will not induce undesirable rotational excitations to the structure under test.

The method comprises the steps of coupling a test object to a rotatable joint having a center of rotation, flexibly restraining the test object from rotating about the center of rotation, and applying vibrational energy substantially along a first axis passing through the center of rotation to the rotatable joint.

The foregoing describes a de-coupled system in which the spacecraft boundary conditions can be easily defined as "free" with a known mass attached to the spacecraft interface. The foregoing system is also easier to manufacture, install, change axes, and maintain. Further, the foregoing system is insensitive to alignment and temperature changes.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
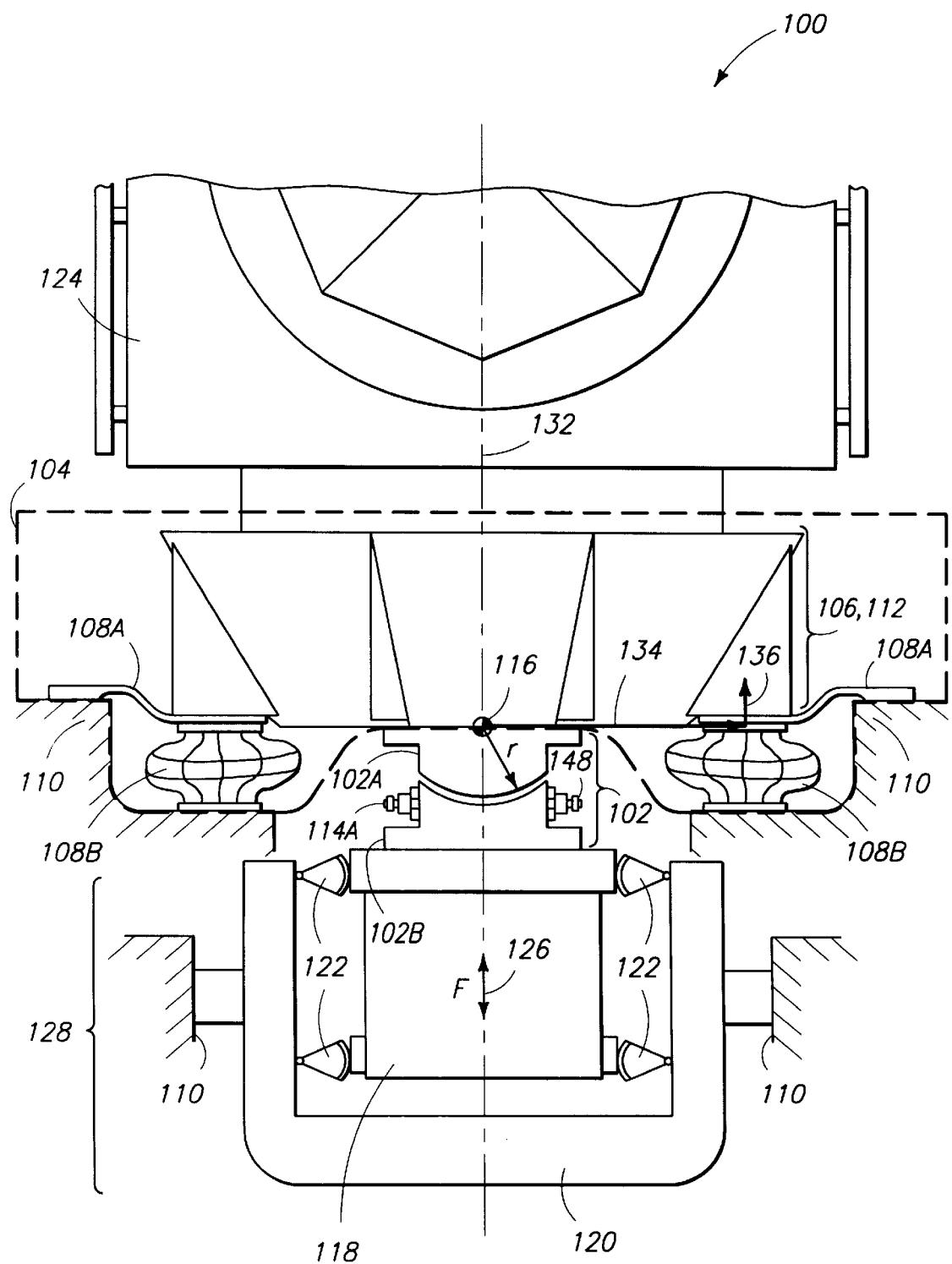
FIG. 1 is a diagram showing a schematic representation of one embodiment of the vibration test system.

FIG. 1 is a diagram showing a schematic representation of one embodiment of the vibration test system 100. The vibration test system 100 comprises a shaker 128, a rotatable joint 102, and a support structure 104. The force generator 128 provides translational vibration motion (typically in the vertical direction) to the test object via the intercoupled rotatable joint 102 and support structure 104.

The shaker 128 comprises a shaker body 120 coupled to the ground datum 110, which supports a force generator 118. Depending on the internal construction of the shaker 128, a system of lateral guides 122 may be disposed between the force generator 118 and the shaker body 120 to assure the shaker's force generator 118 stays centered in the shaker body 120. In one embodiment, the force generator 118 is a commercially available electrodynamics shaker with a stroke of approximately two inches and a force rating between approximately 40,000 and 65,000 pounds. Force generators suitable for this application include those available from UNHOLTZ-DICKIE, LING ELECTRONICS, and LING DYNAMICS SYSTEMS.

The force generator 118 is coupled to a rotatable joint 102. The rotatable joint 102 transmits vibrational energy generated by the force generator 118 along the vertical axis 126 to the support structure 104 and thereby, the test object 124. The rotatable joint 102 assures no moments from the test object 124 and support structure 104 are transferred to the force generator 118 and vice-versa.

In one embodiment of the invention, the rotatable joint 102 is a hydrostatic ball joint comprising a ball portion 102A matingly fitted upon a socket portion 102B. The socket portion 102B accepts pressurized fluid in orifices 114A and/or 114B, and supplies that fluid to the gap between the ball portion 102A and the socket portion 102B. This lubricates the ball joint to minimize friction. In the illustrated embodiment, the ball portion 102A is disposed above the socket portion 102B, but the present invention can be practiced with the orientation of the ball portion 102A and the socket portion 102B reversed (i.e. with the ball portion 102A disposed below the socket portion 102B). A suitable hydrostatic ball joint is commercially available from the TEAM CORPORATION.

As used herein, the term "rotatable joint" includes any coupling device which permits a moment-free or near moment free connection. Hence, while a hydrostatic ball joint is illustrated, the present invention may be practiced with any joint or combination of joints and interfaces which is capable of supporting the weight of the test object while permitting the test object to move about a rotational axis. This may be implemented in many ways. The rotatable joint 102 may be implemented by a combination of bearings. Alternatively, the rotatable joint 102 may comprise a flexure joint providing stiffness in the vertical direction and an order of magnitude more flexibility in resisting rotational motion.

The ball portion 102A transmits forces and vibrational energy from the force generator 118 along the vertical axis 132, and transmits the energy to the support structure 104 and the attached test object 124. The ball portion 102A also provides a lateral shear restraint for the support structure 104. The lateral restraint provided by the ball joint eliminates two of the six possible rigid body modes of the system. Additional lateral restraint may also be provided by the suspension system. Ball portion 102A only restrains the support structure 104 and the test object 124 in two lateral directions. The support structure suspension devices (collectively referred to with the numeral 108) stabilizes the support structure 104 and test object 124 in the remaining four degrees of freedom, thereby providing a "pseudo-free" body system. In one embodiment, the support structure 104 is totally contained in a horizontal plane through the center of rotation 116.

In one embodiment, the support structure includes a head expander 106. The head expander 112 is a very stiff aluminum or magnesium structure that adapts the bolt pattern of the rotatable joint 102 to the test object 124 fixture bolt pattern. For example, in one embodiment, the rotatable joint 102 is a hydrostatic ball joint (which has a bolt circle diameter of approximately twenty inches), the head expander 112 adapts this bolt pattern to accommodate a spacecraft fixture bolt pattern (which has bolt pattern approximately seventy and one half inches in diameter). In one embodiment, the head expander 112 weighs about 3500 pounds, and has no vibration modes below 150 Hz with a rigid test object attached. The mass properties of the head expander 112 (i.e. weight, inertia, and center of gravity), are accurately measured so that these factors can be used in the spacecraft model. Head expanders 112 are not typically commercially available, and are therefore generally built to specification for each intended purpose. In one embodiment, the head expander 112 is a separate structure coupled to the support member 106. Alternatively, the head expander 112 can be a single assembly performing the functions of the support member 106 as well.

The support structure 104 includes a support member 106 and suspension devices such as one or more torsional suspension devices 108A and/or the axial suspension devices 108B (collectively referred to hereinafter as suspension devices 108) disposed between the support member 106 and a ground datum 110. The suspension devices 108 flexibly restrain the test object 124 from rotating about the center of rotation 116. In one embodiment, this is accomplished by orienting the suspension devices 108 so that they apply a suspending force in a direction substantially perpendicular to a vector from the center of rotation 116 to the suspending force. For example, as illustrated in FIG. 1 the direction of the suspending force 136 provided by axial suspension device 108B is perpendicular to vector 134. Further, torsional suspension devices 108A provide a suspension force to restrain torsional motion of the test object in a direction perpendicular to vector 134 (in this case, along an axis emerging perpendicularly from FIG. 1). In a preferred embodiment of the invention, the support member 106 describes a substantially horizontal plane passing through the center of rotation 116 when supported by the suspension devices 108 at an equilibrium position. Thus disposed, the suspension devices 108 provide vertical deflection limits for support structure 104 rotational motion.

In one embodiment, the axial suspension devices 108B are air springs, such as those which are available from the GOODYEAR Tire and Rubber Company or BRIDGESTONE/FIRESTONE, Inc. Such air springs are very soft, and can accommodate the vertical translational deflections imposed by the shaker 128, which are typically 2 inches. Thus configured, the natural frequency of the rocking modes (about the center of rotation 116) is approximately 0.6 Hz, while the natural frequency for vertical motion is approximately 1.5 Hz. To assure accurate test results, the natural frequency of the combination of the test object 124 and the support structure 104 is no greater than one third of the primary structural frequency of the test object 124.

Torsional suspension devices 108A can be either air springs or the flexure devices illustrated in FIG. 1. The torsional suspension devices 108A are oriented in the lateral direction and are attached to the outer diameter of the support member 106 in locations defining a substantially horizontal plane passing through the center of rotation 116.

In one embodiment, the dynamic characteristics of the suspension devices 108 and other physical parameters are selected so that the natural frequency of the combined test object 124 and the support structure 104 is no greater than one third of the primary structural frequency of the test object 124 alone.

Figure 2:
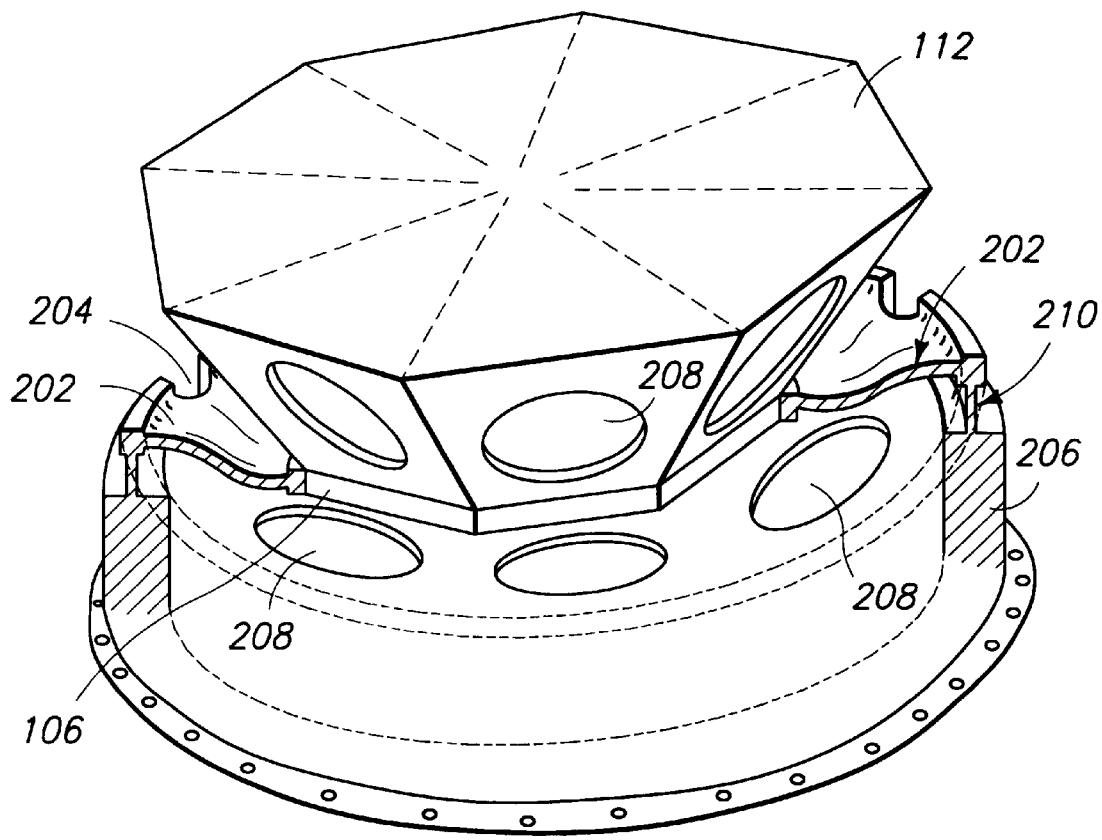
FIG. 2 is a diagram showing a perspective view of one embodiment of the support structure of the present invention using a diaphragm support.

FIG. 2 is a diagram presenting a perspective view of one embodiment of the support structure 104 of the present invention in which the suspension devices 108 comprise a flexible diaphragm 202. The diaphragm 202 is coupled between the periphery of the support member 106 and the ground datum 110 via ground datum support 206. Typically, the diaphragm 202 is attached in support member 106 in the plane of the center of rotation 116. The diaphragm 202 may be constructed many different materials, such as composites, thin sheet metals, or fabric-impregnated rubber materials, and the like. The diaphragm 202 may also include open segments 204 which relieve hoop loading effects on the diaphragm 202.

The structure illustrated in FIG. 2 can be practiced in several embodiments. In one embodiment of the present invention, the diaphragm 202 provides torsional restraint alone, and is not relied upon to provide any significant axial support. Hence, in this embodiment, the diaphragm 202 operates as a torsional suspension device 108A, and is used in conjunction with axial suspension devices 108B. In another embodiment, the diaphragm 202 provides both torsional and axial restraint.

The diaphragm 202 may also comprise a diaphragm vertical segment 206 which can be comprised of materials of different stiffnesses, to provide the appropriate torsional and/or rotational restraint for the support structure 104. Further, the head expander and/or ground datum support 206 may further comprise apertures 208 to permit access to portions of the support structure 104.

Figure 3:
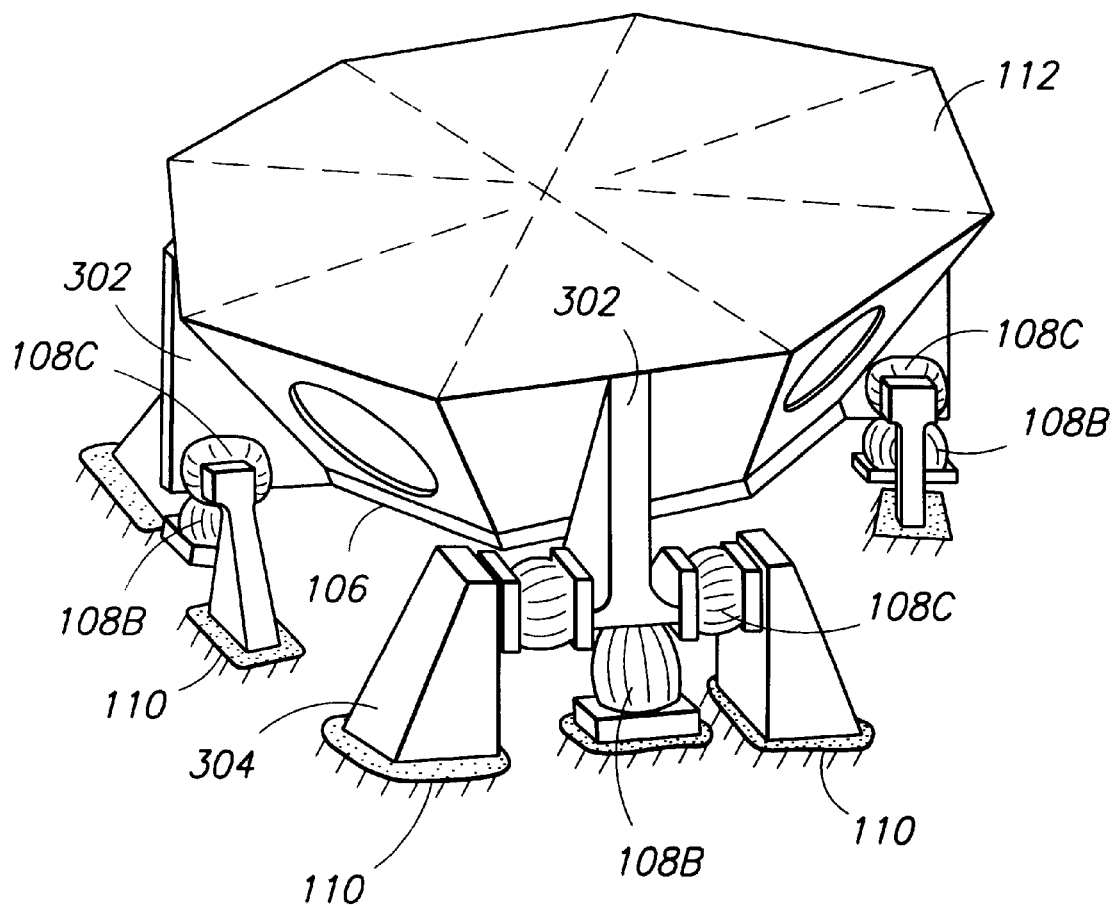
FIG. 3 is a diagram showing a perspective view of a second embodiment of the support structure of the present invention using torsional and axial air bags.

FIG. 3 is a diagram presenting showing a perspective view of an embodiment of the present invention wherein the suspension devices 108 comprise both axial airbags 108B and torsional airbags 108C. The torsional airbags 108C provide both lateral and torsional restraint to the support member 106. In the illustrated embodiment, the axial 108B and torsional 108C airbags are coupled to the support member 106 (or the head expander 112) via support member extensions 302 and to the ground datum 110 via ground datum extensions 302. As before, each of the suspension devices 108 are disposed so that they provide a suspending force perpendicular to a vector from the center of rotation 116 to the location of the suspending device. Hence, axial air bags 108B provide a suspending force in substantially the vertical direction, and torsional air bags 108C provide a suspending force in substantially a horizontal direction so as to oppose torsional motion of the test object 124. Note that the present invention may be practiced in different embodiments in which the support structure extensions 302 are longer or shorter in length. In such embodiments, the portion of the support structure extensions 302 which contact the suspension devices 108 may be angled so that the suspension force remains substantially perpendicular to a vector from the center of rotation to the suspending device 134.

Figure 4:
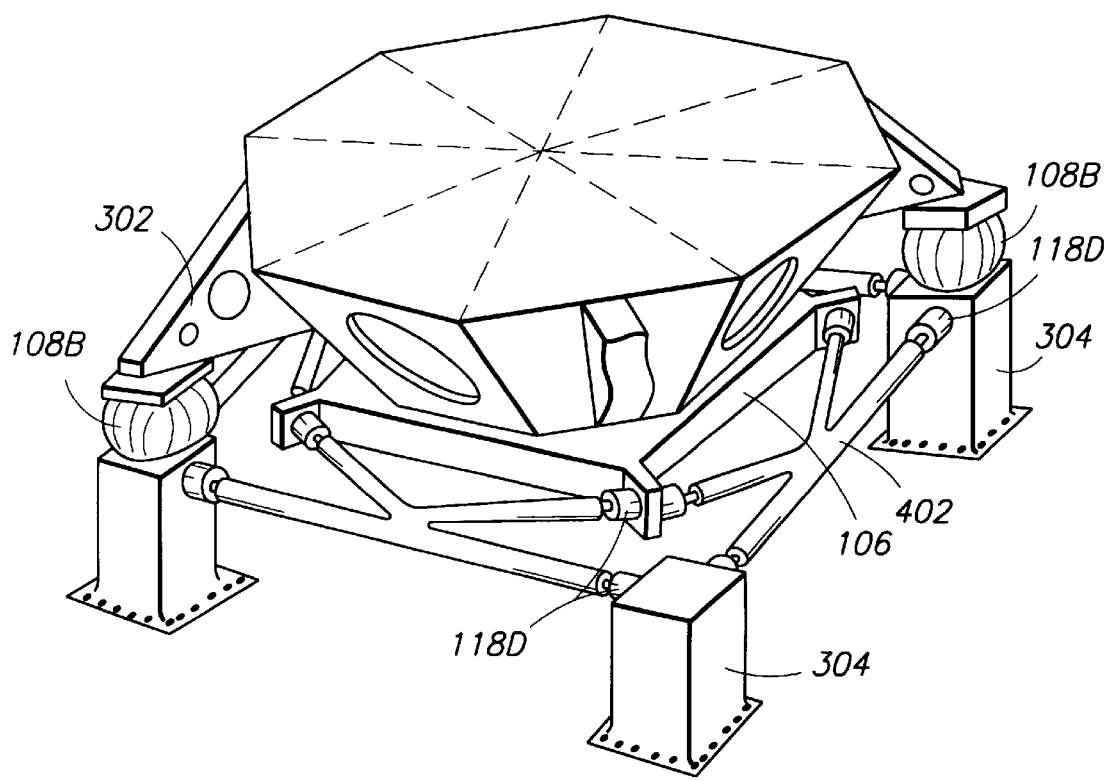
FIG. 4 is a diagram showing a perspective view of a third embodiment of the support structure of the present invention using K-frame isolation members.

FIG. 4 is a perspective view of another embodiment of the present invention using K-frame isolation members. In this embodiment, axial airbags are placed between ground datum extensions 304 and support structure extensions 302 to flexibly restrain the test object 124 and support structure 104 from rotating about the center of rotation 116. Unlike the embodiment illustrated in FIG. 3, the support member 106 is not coupled directly to the ground datum 110. Instead, the support member 106 is coupled to ground datum extensions 304 via a plurality of isolation members 402 and suspension devices 118D. In the illustrated embodiment, the isolation members 402 are K-shaped. In one embodiment, the suspension devices 118D coupling the isolation members 402 to the ground datum extensions 304 and to the support member 106 are hydrostatic rod end bearings such as the HYDRA-BALL bearing available from the TEAM CORPORATION. In the illustrated embodiment, 16 HYDRA-BALL ends are required. Although illustrated with four K-shaped isolation members 402, the present invention can be practiced with isolation members 402 of different configuration, and in greater or less numbers, depending on the desired dynamical characteristics of the vibration test system.

Figure 5:
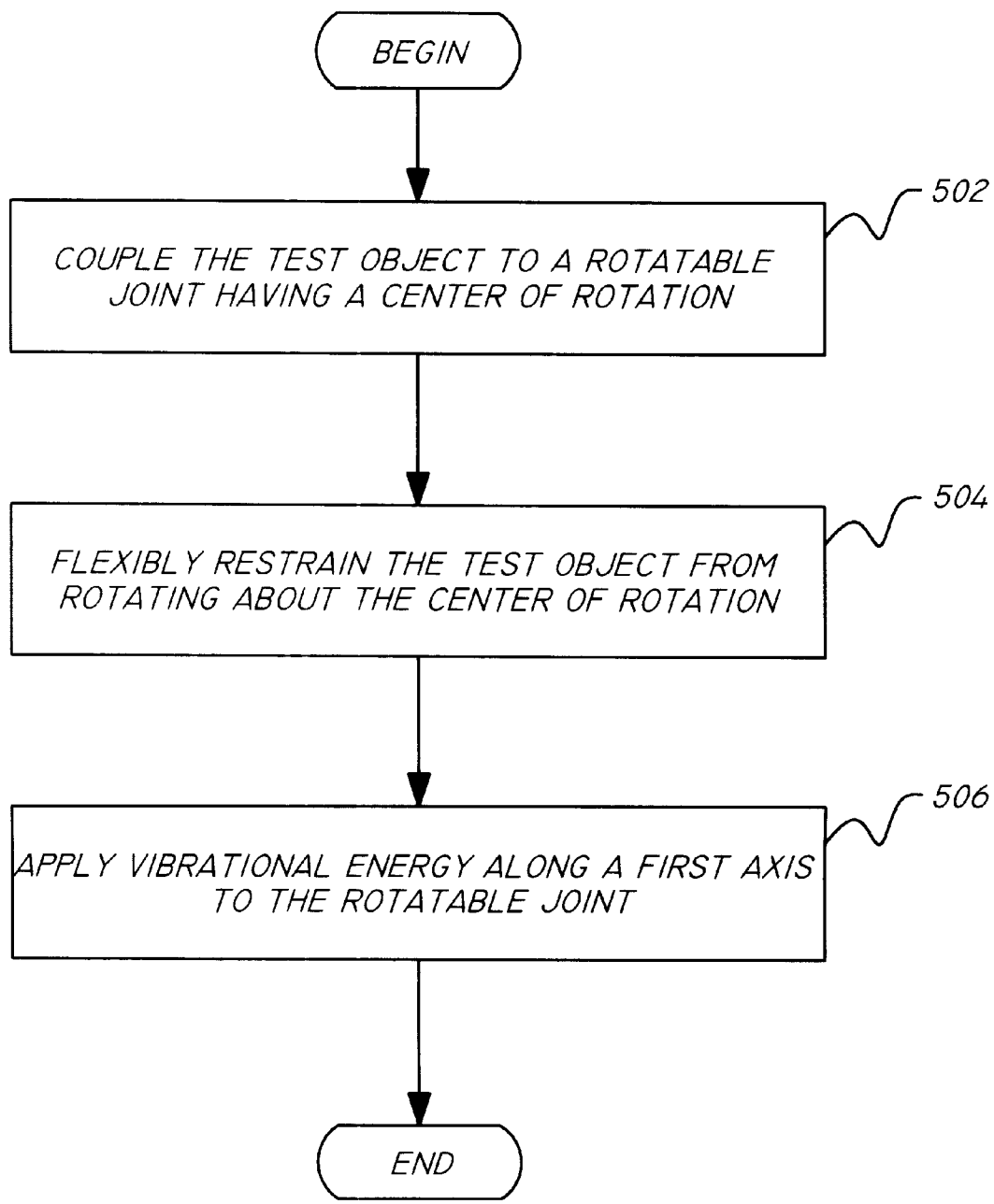
FIG. 5 is a flow chart illustrating exemplary process steps used to practice one embodiment of the present invention.

FIG. 5 is a flow chart illustrating exemplary process steps used to practice one embodiment of the present invention. First, a test object 124 is coupled to a rotational joint 102 having a center of rotation 116. This is illustrated in block 502. The test object may be coupled to the rotational joint 102 via a support structure 104, which may include a head expander 112 to mate the rotational joint 102 to the test object 124. Next, the test object 124 is flexibly restrained from rotating about the rotational joint's 102 center of rotation 116, as shown in block 504. Vibrational energy is then applied along a first axis 132, providing translational forces 126 to the rotatable joint 102, as shown in block 506. This can be accomplished by applying a suspending or restraining force to the test object substantially perpendicular a vector from the center of rotation to the suspending force. In one embodiment of the present invention, the method comprises the additional step of flexibly restraining the test object 124 from torsional rotations (i.e., rotations about the first axis 132).

CONCLUSION

This concludes the description of the preferred embodiments of the present invention. In summary, the present invention describes an apparatus and method for subjecting a test object to vibrational energy.

The apparatus comprises a rotatable joint such as a hydrostatic ball joint for transmitting energy from a force generator to the test object, and a support structure, coupled to the test object and the rotatable joint, for flexibly restraining the test object from rotating about the center of rotation of the rotatable joint. In one embodiment of the invention, the support structure comprises a support member and at least one suspension device disposed between the support member and a ground datum. In another embodiment, the suspension device applies a suspension force to the support member in a direction substantially perpendicular to a vector from the center of rotation to the suspending force. In this embodiment the suspension devices are subjected primarily to compression and tension forces.

The method comprises the steps of coupling a test object to a rotatable joint having a center of rotation, flexibly restraining the test object from rotating about the center of rotation, and applying vibrational energy substantially along a first axis passing through the center of rotation to the rotatable joint.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for subjecting a test object to vibrational energy, comprising:

a rotatable joint for accepting the vibrational energy along a first axis and transmitting the vibrational energy to the test object, the rotatable joint having a center of rotation; and a support structure, coupled to the test object and the rotatable joint, the support structure flexibly restraining the test object from rotating about the center of rotation, the support structure having a support member and at least one suspension device disposed between the support member and a ground datum flexibly applying a suspending force to the support member in a direction substantially perpendicular to a vector from the center of rotation to the suspending force.

2. The apparatus of claim 1, wherein the wherein the rotatable joint permits the coupled support structure to rotate about the first axis and the support structure further restrains the test object from rotating about the first axis.

3. The apparatus of claim 1, wherein:

the first axis is disposed in a substantially vertical direction; and the suspension device applies the suspending force to the support member in a direction substantially perpendicular to a substantially horizontal vector from the center of rotation to the suspending force.

4. The apparatus of claim 1, wherein:

the support structure comprises a plurality of suspension devices, each applying a suspending force acting on the support member at locations substantially defining a horizontal plane passing through the center of rotation.

5. The apparatus of claim 1, wherein the suspension device comprises a flexible diaphragm coupled to a periphery of the support member and the ground datum.

6. The apparatus of claim 5, wherein the support structure diaphragm comprises open segments.

7. The apparatus of claim 1, wherein the support structure comprises a plurality of suspension devices disposed between the support member and the ground datum.

8. The apparatus of claim 7, wherein a natural frequency of the test object and support structure is no greater than one third of a primary structural frequency of the test object.

9. The apparatus of claim 7, wherein the suspension devices are air bags.

10. The apparatus of claim 7, wherein the plurality of suspension devices apply a suspending force to the support member in a direction substantially perpendicular to a vector from the center of rotation to the suspension device and include:

a plurality of axial suspension devices, each disposed between the support member and the ground datum, the axial suspension devices suspending the support structure along an axis substantially parallel to the first axis; and a plurality of torsional suspension devices, each disposed between the support member and the ground datum, the first suspension devices flexibly suspending the support structure along an axis substantially perpendicular to the first axis.

11. The apparatus of claim 7, further comprising an isolating member, disposed between the support member torsional suspension devices and the ground datum, the isolating support member flexibly coupled to the ground datum via isolating support member suspension devices.

12. The apparatus of claim 11, wherein the isolating support member is substantially K-shaped.

13. The apparatus of claim 1, wherein the rotatable joint is a ball joint.

14. The apparatus of claim 1, wherein the rotatable joint is a hydrostatic ball joint.

15. The apparatus of claim 1, wherein the rotatable joint is a flexure device.

16. The apparatus of claim 1, wherein the support structure further comprises a head expander adapted to couple with the test object.

17. A method of subjecting a test object to vibrational energy, comprising the steps of:

coupling the test object to a rotatable joint having a center of rotation;

flexibly restraining the test object from rotating about the center of rotation by applying a suspending force to the test object in a direction substantially perpendicular to a vector from the center of rotation to the suspending force; and applying vibrational energy along a first axis to the rotatable joint.

18. The method of claim 17, wherein the rotatable joint permits the coupled test object to rotate about the first axis and the method further comprises the step of flexibly restraining the test object from rotating about the first axis.

19. An apparatus for subjecting a test object to vibrational energy, comprising:

a rotatable joint for accepting the vibrational energy along a first axis substantially aligned with a center of mass of the test object and transmitting the vibrational energy to the test object, the rotatable joint having a center of rotation; and a support structure, coupled to the test object and the rotatable joint, the support structure flexibly restraining the test object from rotating about the center of rotation.

* * * * *